US 9,400,626 B2

(12) United States Patent
Shiratori

(10) Patent No.: US 9,400,626 B2
(45) Date of Patent: Jul. 26, 2016

(54) RETRIEVING DATA FROM A POSTING SERVER FOR PRINTING

(71) Applicant: SEIKO EPSON CORPORATION, Tokyo (JP)

(72) Inventor: Kohei Shiratori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/285,785

(22) Filed: May 23, 2014

(65) Prior Publication Data
US 2014/0376040 A1  Dec. 25, 2014

(30) Foreign Application Priority Data

Jun. 25, 2013 (JP) .................... 2013-133055
Jul. 29, 2013 (JP) .................... 2013-156510

(51) Int. Cl.
*G06F 3/12* (2006.01)

(52) U.S. Cl.
CPC ............ *G06F 3/1268* (2013.01); *G06F 3/1204* (2013.01); *G06F 3/1207* (2013.01); *G06F 3/1244* (2013.01); *G06F 3/1259* (2013.01); *G06F 3/1287* (2013.01)

(58) Field of Classification Search
CPC ..... G06F 3/126; G06F 3/1293; G06F 3/1287; G06F 3/1268; G06F 3/1265
USPC ......................................... 358/1.15
See application file for complete search history.

(56) References Cited

U.S. PATENT DOCUMENTS

| | | | |
|---|---|---|---|
| 7,886,000 B1* | 2/2011 | Polis et al. ..................... 709/203 |
| 2008/0068646 A1 | 3/2008 | Kobayashi |
| 2009/0310164 A1* | 12/2009 | Takahashi et al. ........... 358/1.13 |
| 2010/0302579 A1* | 12/2010 | Nuggehalli et al. ......... 358/1.15 |
| 2012/0194864 A1 | 8/2012 | Oshima et al. |
| 2015/0116761 A1* | 4/2015 | Yamada et al. .............. 358/1.15 |
| 2015/0244878 A1* | 8/2015 | Macauley ............. G06F 3/1204 358/1.2 |

FOREIGN PATENT DOCUMENTS

| | | |
|---|---|---|
| JP | 2001-084191 A | 3/2001 |
| JP | 2008-071257 A | 3/2008 |
| JP | 2012-159914 A | 8/2012 |

\* cited by examiner

*Primary Examiner* — Eric A Rust
(74) *Attorney, Agent, or Firm* — Global IP Counselors, LLP

(57) ABSTRACT

A printing control server includes an acquisition section and a printing control section. The acquisition section is configured to acquire posting data containing a specific character string in a posted content from a service offering server which provides a posting service. The printing control section is configured to make a printing device execute printing based on the posting data acquired.

10 Claims, 8 Drawing Sheets

SETTING DATA OF SNS "SERVICE A"

| SNS ACCOUNT OF USER | PRINTER ADDRESS | DEVICE NUMBER | ... |
|---|---|---|---|
| @aaa | XXXXXXX | EPXXXXX | ... |
| @bbb | XXXXXXX | EPXXXXX | ... |
| @ccc | XXXXXXX | EPXXXXX | ... |
| @abc | XXXXXXX | PXXXXXX | ... |
| @xzy | XXXXXXX | PXXXXXX | ... |
| ⋮ | ⋮ | ⋮ | ⋮ |

RETRIEVING DATA FROM A POSTING SERVER FOR PRINTING

CROSS-REFERENCE TO RELATED APPLICATIONS

This application claims priority to Japanese Patent Application No. 2013-133055 filed on Jun. 25, 2013 and Japanese Patent Application No. 2013-156510 filed on Jul. 29, 2013. The entire disclosure of Japanese Patent Application Nos. 2013-133055 and 2013-156510 are hereby incorporated herein by reference.

BACKGROUND

1. Technical Field

The present invention relates to a printing control server and a printing system for controlling printing in a printing device from a user's terminal by using a service offering server which provides a posting service such as a social networking service (SNS).

2. Related Art

Recent years, the users who use the social networking service (SNS) realized by a cloud computing technology are increasing rapidly. The users post texts or files (e.g., image file such as a picture, etc.) to the SNS, so that the posting contents can be published for the users who allow browsing.

Further, as a printing system using a cloud computing technology, for example, in Japanese Laid-open Patent Application No. 2001-84191, it discloses a document output support device that performs printing an attached document in a printer by sending an electronic mail in which a document was attached to a mail address set to the printer from the terminal by using an electronic mail function provided in the terminal. Further, for example, in Japanese Laid-open Patent Application No. 2008-71257, it discloses that when a decision is made by the mobile terminal that the reception of the mail information, which was received by the mail server, is not available, the printing system transfers the mail information to the transfer destination printer device. In addition, in Japanese Laid-open Patent Application No. 2012-159914, it discloses a cloud computing system that can print texts or an attached file of an electronic mail by sending an electronic mail to the printer.

SUMMARY

However, conventionally, a system in which a user can easily print the posting data, which was posted in the social networking service (SNS) from the mobile terminal such as a smartphone, by a printer was not existed, so that the user of the SNS cannot print the posting contents in a simple operation.

The present invention was made to solve the aforementioned problems, and its purpose is to provide a printing control server and a printing system capable of making a printing device execute printing based on posted data when posted from a terminal.

A printing control server includes an acquisition section and a printing control section. The acquisition section is configured to acquire posting data containing a specific character string in a posted content from a service offering server which provides a posting service. The printing control section is configured to make a printing device execute printing based on the posting data acquired.

According to this structure, the acquisition section acquires the posted data containing the specific character string in the posted content from the service offering server. The printing control section makes the printing device execute printing based on the posted data acquired. Therefore, by posting with a specific character string contained in the posted content from a terminal, it becomes possible to make the printing device execute printing based on the posted data.

In the printing control server, it is preferable that the acquisition section is configured to specify a tag of the specific character string as a condition of the posting data to be provided to the acquisition section and to receive the posting data containing the tag of the specific character string from the service offering server.

According to this structure, the acquisition section can narrow the posted data to be acquired from the service offering server down to the posted data including the tag of the specific character string, which can decrease the processing load of the printing control server.

In the printing control server, it is preferable that the acquisition section is configured to acquire at least the posting data containing the specific character string for instructing execution of printing and a condition specifying character string for specifying a print condition in printing executed by being instructed by the specific character string.

According to this structure, the specific character string for instructing execution of printing and the condition specifying character string for specifying a printing condition are contained in the posted data to be a print object among posted data to be acquired by the acquisition section. Therefore, the print control section makes the printing device execute printing based on the posted data instructed by the specific character string under the print condition specified by the condition specifying character string.

In the printing control server, it is preferable to provide an administration section configured to associate the printing device with a user of the printing device and administer the printing device as being associated with the user. The printing control section is preferably configured to make the printing device associated with the user who posted the posting data acquired or the user to whom the posting data acquired was addressed execute printing based on the posting data.

According to the structure, the printing control section makes the printing device corresponding to the user who posted the posted data acquired or the printing device corresponding to the user to whom the posted data acquired was addressed execute printing based on the posted data. Accordingly, by posting with a specific character string contained from a terminal, it becomes possible to make the printing device corresponding to the user execute printing based on the posted data.

In the printing control server, it is preferable that the printing control section is configured to receive, after sending print data created based on the posted data, at least one of notifications including a receipt notification indicating a receipt of a print instruction, a completion notification indicating completion of printing, and an error notification indicating occurrence of a print error from the printing device, and to post a content of the at least one of the notifications received to the service offering server addressing the user of the terminal which is an origin of the posting data or the printing device that printed the posting data.

According to this structure, after sending the print data created based on the posting data to the printing device, the printing control section receives from the printing device at least one of the receipt notification indicating a receipt of a print instruction, the completion notification indicating a completion of printing, and the error notification indicating occurrence of a print error. Then, the contents of the received notification are posted to the service offering server addressing to the user of the terminal of the posting source or the printing device that printed the posting data. Accordingly, the posted person or the user of the printing device printed the posting data can know at least one of a receipt of the print instruction by posting by the printing device, a completion of the instructed printing and an error of the instructed printing.

The printing system which solves the aforementioned problems is equipped with the printing control server and the printing device which is administrated by the administration section of the printing control server as being associated with the user.

According to this structure, by sending the posting in which a specific word is contained in the posted content from the terminal, the posting data is acquired from the service offering server by the printing control server. The printing control section of the printing control server can make the printing device execute printing based on the posting data.

BRIEF DESCRIPTION OF THE DRAWINGS

Referring now to the attached drawings which form a part of this original disclosure.

DETAILED DESCRIPTION OF EXEMPLARY EMBODIMENTS

Figures 1, 2:
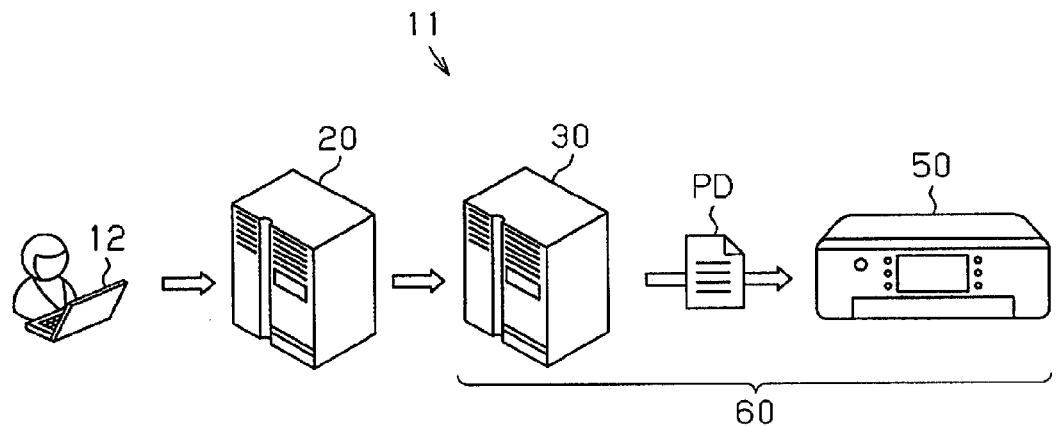
FIG. 1 is a schematic diagram showing a print support system according to an embodiment.
FIG. 2 is a diagram showing a data structure of setting data.

Hereinafter, a print support system according to an embodiment is described in reference to FIGS. 1 to 7.

As showing FIG. 1, the print support system 11 is provided with a user terminal 12, a social networking service server (hereinafter referred to as "SNS server 20"), a printing control server 30, and a printing device 50 specified by the user. Further, in this embodiment, a printing system 60 is constituted by the printing control server 30 and the printing device 50. The user terminal 12, the SNS server 20, the printing control server 30, and the printing device 50 that constitute the print support system 11 are connected in a communicable manner with each other through the Internet 70 (see FIG. 3). In this embodiment, an example of the service offering server which provides a posting service is constituted by the SNS server 20.

As an example of the user terminal 12, a personal computer can be exemplified, and other than that, a portable information terminal (PDA (Personal Digital Assistants)), a tablet PC, a smartphone, a mobile phone, etc., can be used. In short, it can be anything if the user terminal 12 has a function that connects with the SNS server 20. The user preliminary obtains a user account that the terminal 12 accesses to the SNS server 20.

The SNS server 20 provides a social networking service (hereinafter referred to as "SNS"). The SNS denotes a service capable of communicating with users each other through the Internet in various formats. For example, as a SNS, "TWITTER (registered trademark)," "FACEBOOK (registered trademark)," "MIX! (registered trademark)," "GREE (registered trademark)," etc., that provide a posting service, can be exemplified. The SNS server 20 of this embodiment provides, for example, a posting service.

The printing device 50 is provided with a communication interface (not shown in the drawings) which is capable of performing an Internet communication, and is connected to the printing control server 30 through the Internet 70. When the user posts to the SNS server 20 from the terminal 12, the printing control server 30 controls the printing device 50, which is associated with the user, to perform a printing process for the posting contents or the print contents corresponding to the posting contents. The printing control server 30 monitors the postings received by the SNS server 20, and acquires the posted data from the SNS server 20 when the postings were made. The printing control server 30 creates print data PD based on the acquired posting data, and sends the print data PD to the printing device 50 specified by the user to make the printing device 50 execute printing based on the posting. In the print control server 30, setting data SD as shown in FIG. 2 is stored as a database. The setting data is registered by the user to receive the print support service using the posting service provided by the SNS server 20 and associated with the user and the printing device 50 specified by the user as a print destination.

FIG. 2 shows an example of the setting data SD stored in the printing control server 30. In the setting data SD, user accounts (SNS accounts) for connecting to the SNS server 20, addresses on the Internet for printing devices 50 desired as print destinations (printer addresses), device numbers of the printing devices 50, and other predetermined information are contained. As described, in the setting data SD, the SNS account of the user and the printer address are registered so as to be correlated with each other. Here, the printer address can be, for example, an IP address. The printer address can be an address capable of sending the print data to the printing device 50 through the network from the printing control server 30. In the setting data SD, considering the case that family members may use a common printing device, it is configured to be able to set a common printing device (printer address) in common for the plurality of users (SNS accounts).

Figure 3:
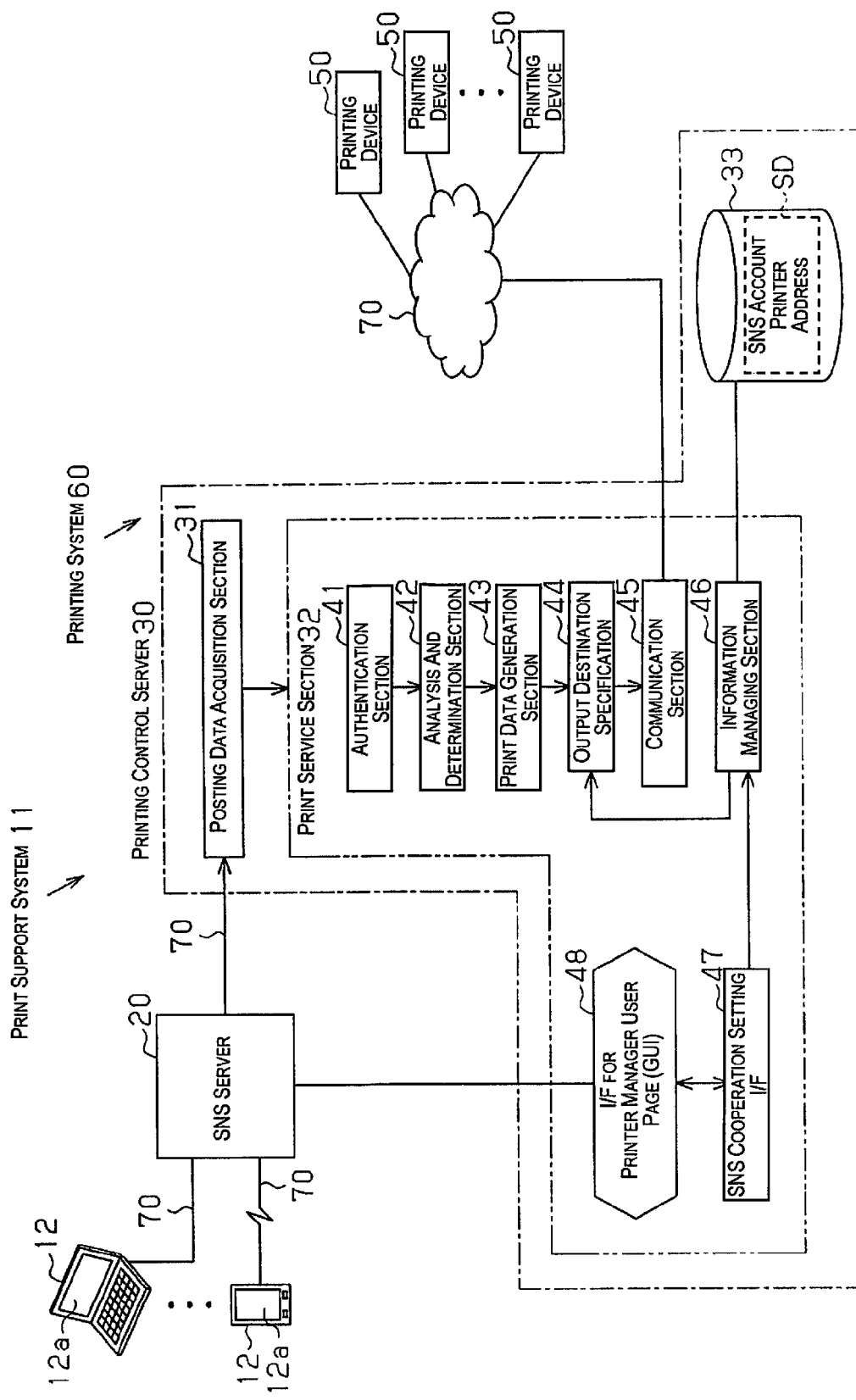
FIG. 3 is a block diagram showing a functional structure of a printing control server.

Next, the schematic structure of the print support system 11 and the functional structure of the printing control server 30 will be described with reference to FIG. 3. As shown in FIG. 3, the print support system 11 is provided with a plurality of user terminals 12, the SNS server 20, the printing control server 30, and a plurality of printing devices 50, and they are connected in a communicable manner with each other through the Internet 70. The plurality of printing devices 50 shown in FIG. 3 are specified by users registered in the printing control server 30 for using the print support service so as to print by using the SNS provided by the SNS server 20. Each user terminal 12 has a display section 12a capable of displaying a posting screen, etc.

As shown in FIG. 3, the printing control server 30 is provided with a posting data acquisition section 31 as an example of an acquisition section, a print service section 32, and a storage section 33 that stores necessary information for printing control including setting data SD. In this embodiment, the posting data acquisition section 31 and the print service section 32 are constituted by separate servers, and the printing control server 30 is configured by the server system having a plurality of servers. The printing control server 30 can be constituted by one server or can be constituted by three or more servers.

The posting data acquisition section 31 preliminarily specifies a specific character string and requires providing of the posting data containing the specific character string in the posted document 64 (text body) to the SNS server 20 to make the SNS server 20 monitor the specified posting. The SNS server 20 has a function of monitoring the posting that satisfies the conditions of the preliminary requested character string among received postings and providing, when there is a corresponding posting, the corresponding posting data to the request source. In this example, the posting data acquisition section 31 specifies a specific character string in the posted document using, for example, a hash tag, which is an example of a tag, and requests providing of the posting containing the specific character string. The SNS server 20 analyzes sequentially received postings to judge whether there exists a specific character string to be monitored, and sends the posting data which is an object to be monitored, if any, to the printing control server 30, which is a request source, as a posting to be printed. The posting data acquisition section 31 acquires the posting data including contents of the corresponding posting and metadata accompanied by the posting from the SNS server 20. The acquired posting data is sent from the posting data acquisition section 31 to the print service section 32. The specific character string mentioned here can include not only characters but also numerals, symbols, marks, etc.

Here, the SNS server 20 manages a "text of the posting document (posting body text)," and an "URI (Uniform Resource Identifier) of reference file (e.g. URL)" when there is a link, as a content of the posting, and manages at least the "user name," the "hash tag," etc., as metadata accompanied by the posting. The posting data acquisition section 31 acquires the data of the posted content including the specific character string and metadata.

The print service section 32 shown in FIG. 3 is provided with an authentication section 41 authenticating whether or not the source of the posting acquired by the posting data acquisition section 31 is the user who has already been registered in the print support service, an analysis and determination section 42 determining whether or not it is a print object by analyzing the posting data, and a print data generation section 43 generating print data that is printable in the specified printing device 50 based on the posted data.

Further, the print service section 32 is provided with an output destination specification section 44 that acquires a printer address as an output destination of the print data, and a communication section 45 that sends print data to the printing device 50 specified by the printer address through the Internet 70. Here, the output destination specification section 44 acquires the specified printer address linked to the SNS account of the user by referring the setting data SD stored in the storage section 33. In this embodiment, as an example, the printing control section is configured by the authentication section 41, an analysis and determination section 42, the print data generation section 43, the output destination specification section 44, and the communication section 45.

Further, the print service section 32 shown in FIG. 3 is provided with a related information managing section 46 that performs registration processing by writing the registration information, which was received from the user terminal 12, to the setting data SD of the storage section 33, and an SNS cooperation setting interface (hereinafter referred to as "SNS cooperation setting I/F 47"). The output destination specification section 44 sends the SNS account of the posting source to the related information managing section 46, and requests to acquire the printer address corresponding to the SNS account. The related information managing section 46 that received this request reviews the setting data SD and sends printer address information correlated with the SNS account to the output destination specification section 44. In this embodiment, as an example, the administration section is configured by the related information managing section 46 and the storage section 33.

Further, the SNS cooperation setting I/F 47 provides the user page as an interface for a printer manager (hereinafter referred to as "printer manager I/F 48") on the Internet 70 in cooperating with the SNS server 20. This user page is configured by the Graphical User Interface (GUI) capable of performing majority of basic operations by using a lot of graphics by a pointing device such as a mouse. In this user page, the registration to the printing control server 30 and the registration to the SNS server 20 can be performed in cooperation with each other. In FIG. 3, only one SNS server 20 is shown but the printing control server 30 cooperates with a plurality of SNS servers 20 that respectively provide an individual SNS.

Next, the registration procedure performed in the user page for the user to receive the print support service will be described in reference to FIG. 4. The user operates the terminal 12 to access the printing control server 30, so that it is possible to display an initial setting screen RP of the user page UP (printer manager I/F 48) in the display section (monitor).

Figure 4A:
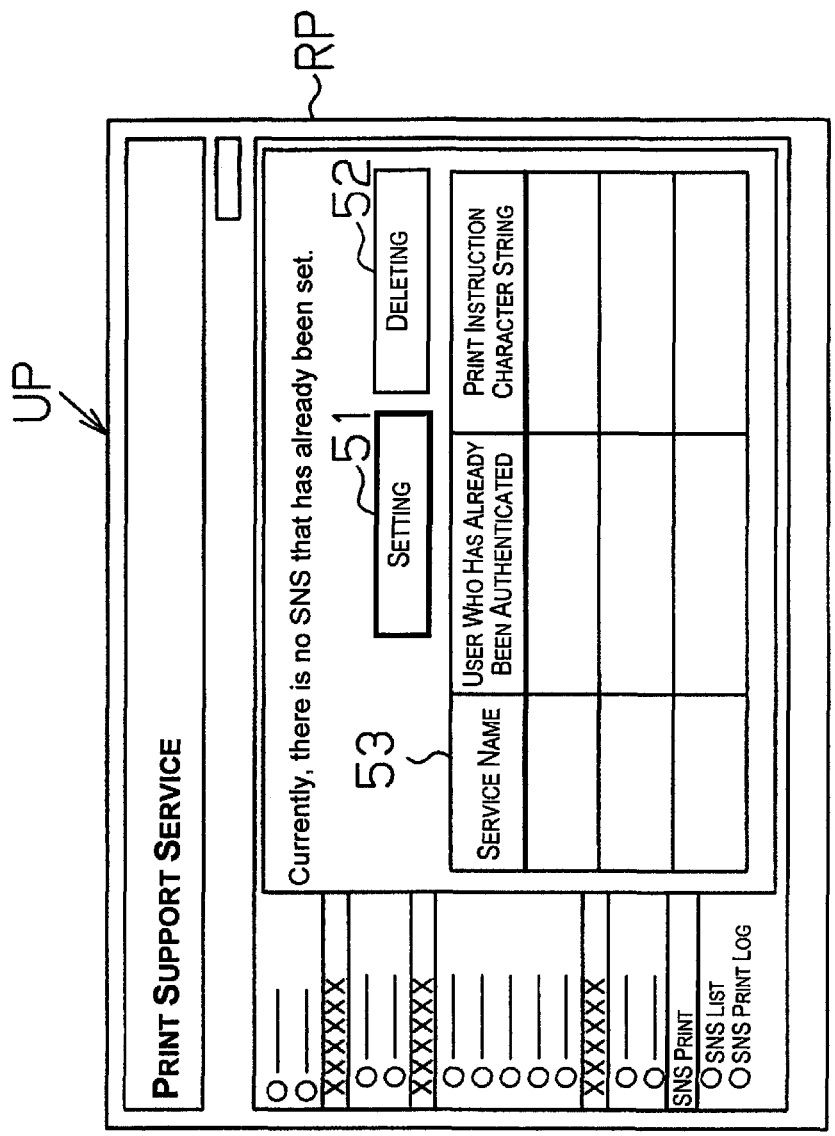
FIGS. 4A to 4D are diagrams showing setting screens for registration to the print support service.

The initial setting screen RP of the user page UP shown in FIG. 4A is the SNS setting screen for selecting the user's desired SNS to perform setting, and is provided with a setting button 51, a deleting button 52, and a display column 53 in which the list of SNSs that have already been set is displayed. When SNSs, which have already been set, are existed, the service names of the SNSs, which are printable, and the SNS accounts of the users, which have already been authenticated, are displayed in the display column 53 but in an example as shown in FIG. 4A, it has not been set yet, so that the list is blank. When the setting button 51 is operated in the initial setting screen RP, it switches to the SNS selection screen SP as shown in FIG. 4B.

Figure 4B:
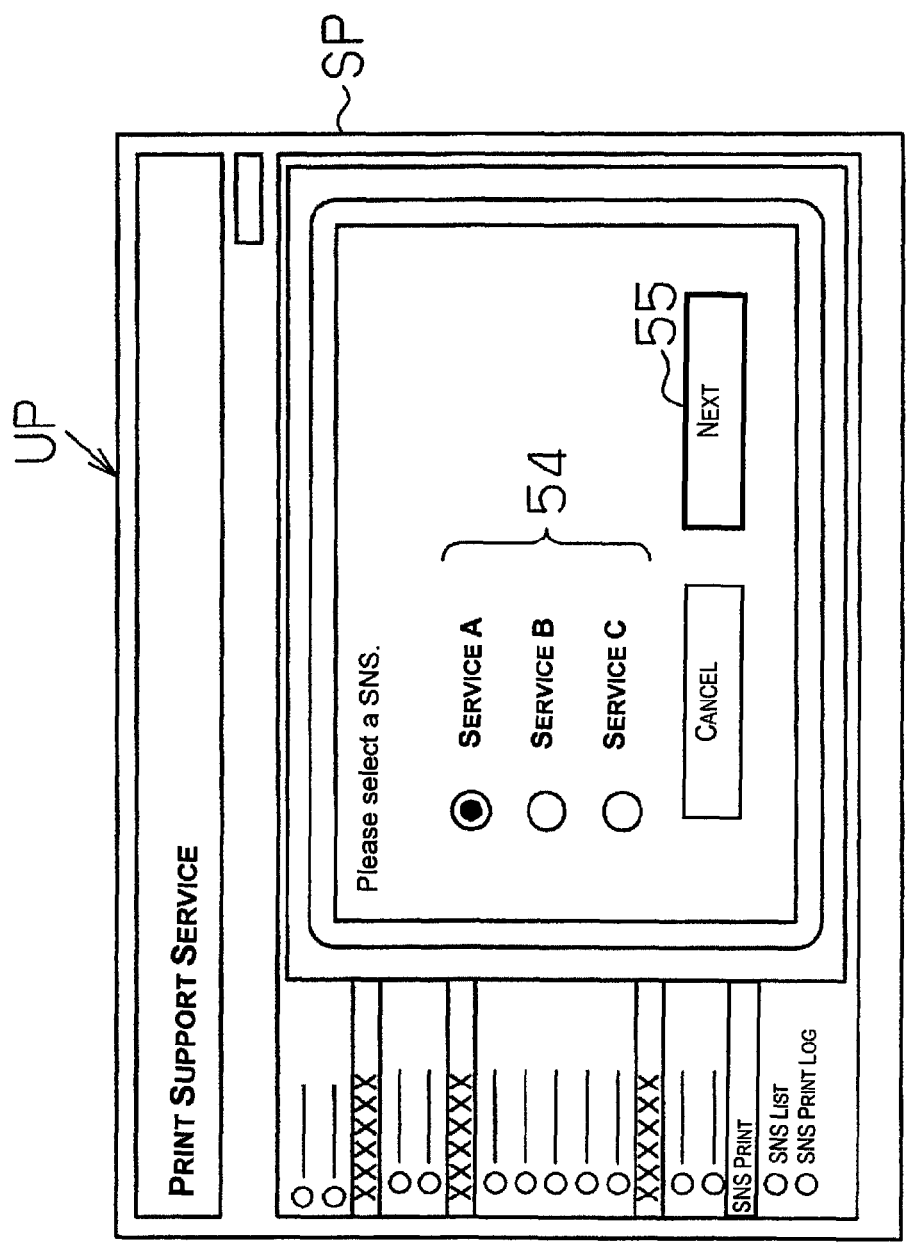

The SNS selection screen SP shown in FIG. 4B is used for the user to select and set the desired SNS from among the plurality of SNSs for use of the print support service. The SNS selection screen SP displays an alternative 54 (e.g., radio buttons) so that among the plurality of SNSs, the user can select one which is desired for use of the print support service. In an example of the SNS selection screen SP shown in FIG. 4B, it displays the alternative 54 including selectable three SNSs of "Service A," "Service B," and "Service C." In a state in which the desired SNS (selecting "Service A" in the example of the drawing) was selected among the alternative 54, when the user operates the button "NEXT" 55, the terminal 12 is connected to the SNS server 20 that provides the selected "Service A," and the connection screen CP (login screen) for "Service A" as shown in FIG. 4C is displayed in the display section 12a of the user terminal 12.

Figure 4C:
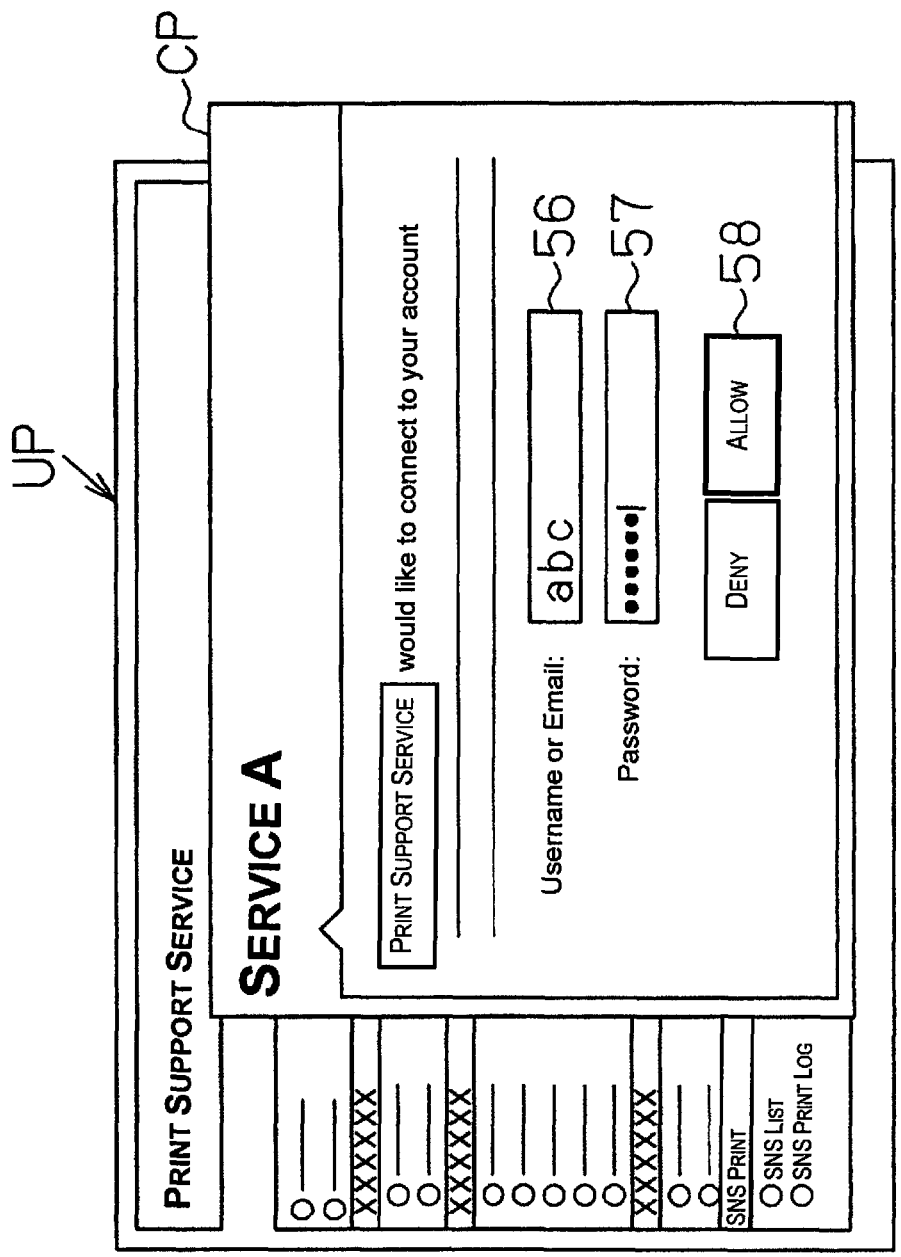
Figure 4D:
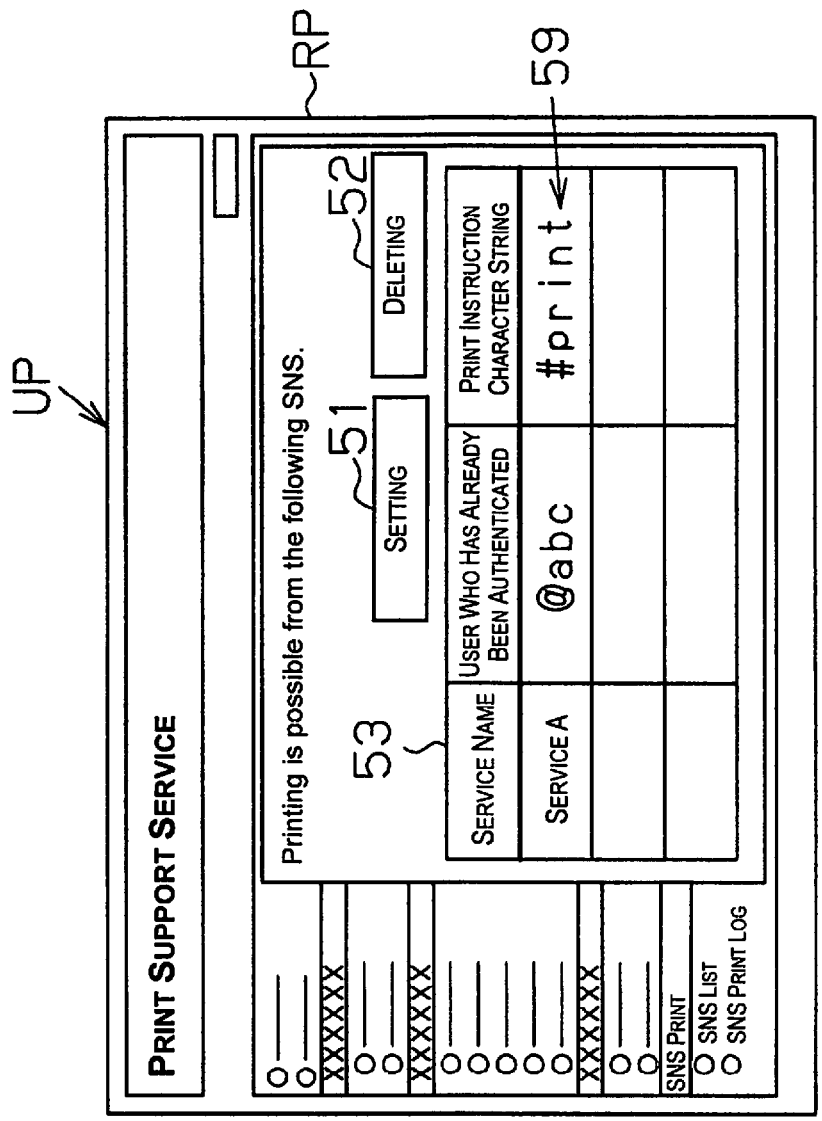

The connection screen CP shown in FIG. 4C is a screen in which the "print support service" requests a connection to "Service A," and the user inputs the SNS account in the user name input column 56 for connecting to Service A, inputs a password in the password input column 57 and operates a permission button 58. By this operation, the input information is sent to the printing control server 30, "Service A," which is the SNS that the user uses for the print support service, and the SNS account of the user used in "Service A" are registered in the printing control server 30. The registration information is added to the setting data SD stored in the storage section 33 of the printing control server 30. In the display section 12a of the terminal 12, the setting screen RP shown in FIG. 4D is displayed. In the display column 53 on this setting screen RP, the service name of the SNS "Service A," which is printable, and the SNS account of the user "@abc," which has already been authenticated, are displayed.

Further, as shown in FIG. 4D, in the display column 53, "#print" as a print instruction character string 59, which is an example of a specific character string used to instruct execution of printing the posting, is displayed. In this embodiment, the print instruction character string 59 is a hash tag (one example of tag) as an example. The hash tag denotes a character string in which a hash mark "#" is added to the head, and specifying the hash tag to the SNS server 20 enables acquisition of the posting data containing the hash tag by collectively searching the hash tag. Further, in the hash tag "#print" in this example, "instruction of print execution" is defined in the printing control server 30.

Further, in this embodiment, the condition specifying character string 59A for specifying the print condition (see FIG. 5) is also defined in the printing control server 30. For example, a print condition specifying area is provided after "#print," the print condition is specified by arranging numbers, for example, after a half-size space and the hash mark "#." In this example, as an example of the print condition, it is possible to specify "number of copies," numbers of the number of copies are arranged after the hash mark. For example, in cases where the number of copies is "3," for example, after the hash tag "#print" which is a print instruction character string 59, a hash tag "#3" is described as a condition specifying character string 59A.

That is, with "#print #3," it is possible to instruct "three" prints. Further, the print instruction character string 59 and the condition specifying character string 59A can be reversed in the arrangement sequence, or can be arranged at positions apart from each other in the posted document. Further, the condition specifying character string is not limited to a hash tag. For example, numeral values of the number of copies are described after the print instruction character string 59 with no hash mark with a space, and in the case of "three printing," it can be described as "#print 3." In this specification, although the hash tag is shown by a full-width alphanumeric, actually, a half-width alphanumeric is used.

Further, when a plurality of SNSs, which are printable, are desired, the user operates the setting button 51 in the setting screen RP shown in FIG. 4D and switches to the SNS selection screen SP shown in FIG. 4B, and selects another SNS in the SNS selection screen SP, and performs the setting operation in the same procedure when "Service A" was set.

Further, before or after the registration of the SNS that uses the print support service, the setting information such as a printer address and a device number of the printing device 50 that uses at the time of using the print support service is set in a different screen of the user page UP (not shown in the drawings). In this way, the registration information such as a user SNS account, a printer address, a device number, etc., is added in each SNS setting data SD as shown in FIG. 2.

Next, the process for posting data acquired by the printing control server 30 will be described.

Figure 5:
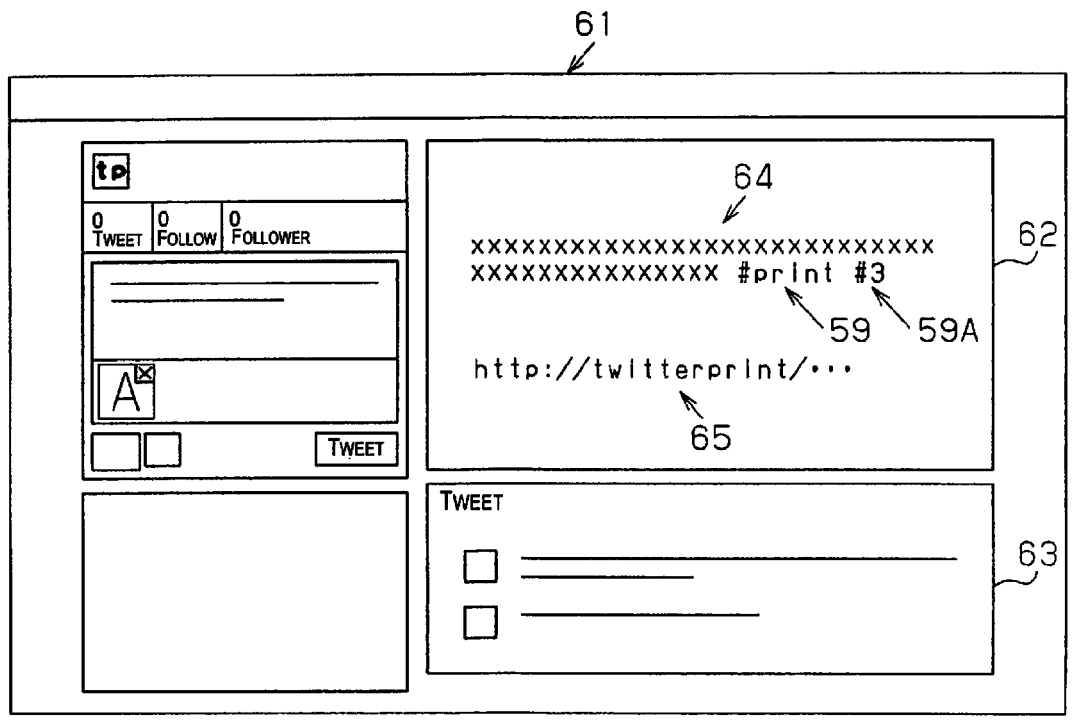
FIG. 5 is a diagram showing an example of a posting screen.

FIG. 5 shows an example of the posting screen. When the user who has already been registered in the print support service connects (login) to the SNS server 20 from the terminal 12, a posting screen 61 shown in FIG. 5 is displayed in the display section 12a. As an example, the posting screen 61 is provided with a posting area 62 for writing posting contents and a time-line 63 for showing the posted tweets in time series. By posting in the posting screen 61 of the SNS that has already been registered for use of the print support service by the user who has already been registered for the print support service, it is possible to print the print contents corresponding to the posting contents by the specified printing device 50. Therefore, it is possible to make the specified printing device 50 execute the desired printing by the posting action as a print instruction. The user creates a posting document 64 in the posting area 62 of the posting screen 61 displayed in the terminal 12, and if necessary, a link 65 showing an address of the storage location of the image (e.g., Uniform Resource Identifier (URI)) is provided.

As shown in FIG. 5, in this embodiment, a hash tag "#print" is written in the posted document 64 (posted contents) (for example, at the end of the text) as a print instruction character string 59. Further, as one of print conditions, in cases where it is desired to specify the number of copies, a condition specifying character string 59A for specifying the print condition is written. For example, in cases where it is desired that the number of copies is "three," "#3" is written as the condition specifying character string 59A. In the example shown in FIG. 5, for example, "#print #3" is written at the end of the text of the posted document 64. When a user operates the terminal 12 to post, the posting data is sent from the user terminal 12 to the SNS server 20.

The printing control server 30 acquires posting data containing a print instruction character string 59 in the posted document 64 among postings that the SNS server 20 received from the SNS server 20. The printing control server 30 creates print data from the acquired posting data and sends the print data to the printing device 50 specified by the user to thereby make the printing device 50 execute printing.

Figure 6:
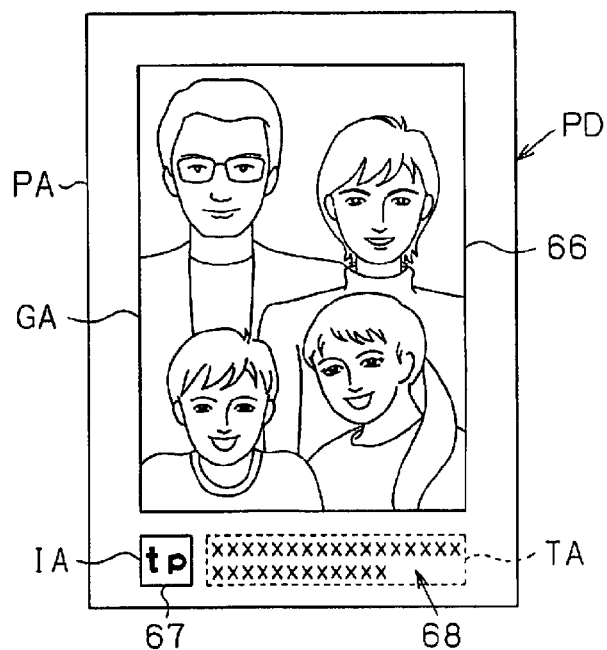
FIG. 6 is a schematic diagram showing print data.

FIG. 6 is an example of print data to be generated based on the posted data. The printing control server 30 lays out a posted body text, an image, and an icon in the paper area PA of the memory by applying magnification/reduction if necessary, and creates printable print data PD in the layout. In the example shown in FIG. 6, the image 66 (e.g., picture, etc.) acquired from the address (URI) specified in the link 65 is arranged in the image area GA in the paper area PA, and an icon 67 and a posted body text 68 of the writer (source) are respectively arranged in an icon arrangement area IA and a text arrangement area TA that are horizontally arranged below the image area. This layout can be preliminary made on the printing control server 30 side, but it is preferable that the user can select a desired print layout among samples of a plurality of print layouts provided by the printing control server 30. Further, other information (e.g., user name, profile, etc.) that can be acquired from the metadata which configures the posting data is arranged in the paper area PA and it may be printed. The print instruction character string 59 and the condition specifying character string are excluded from the print object.

Figure 7:
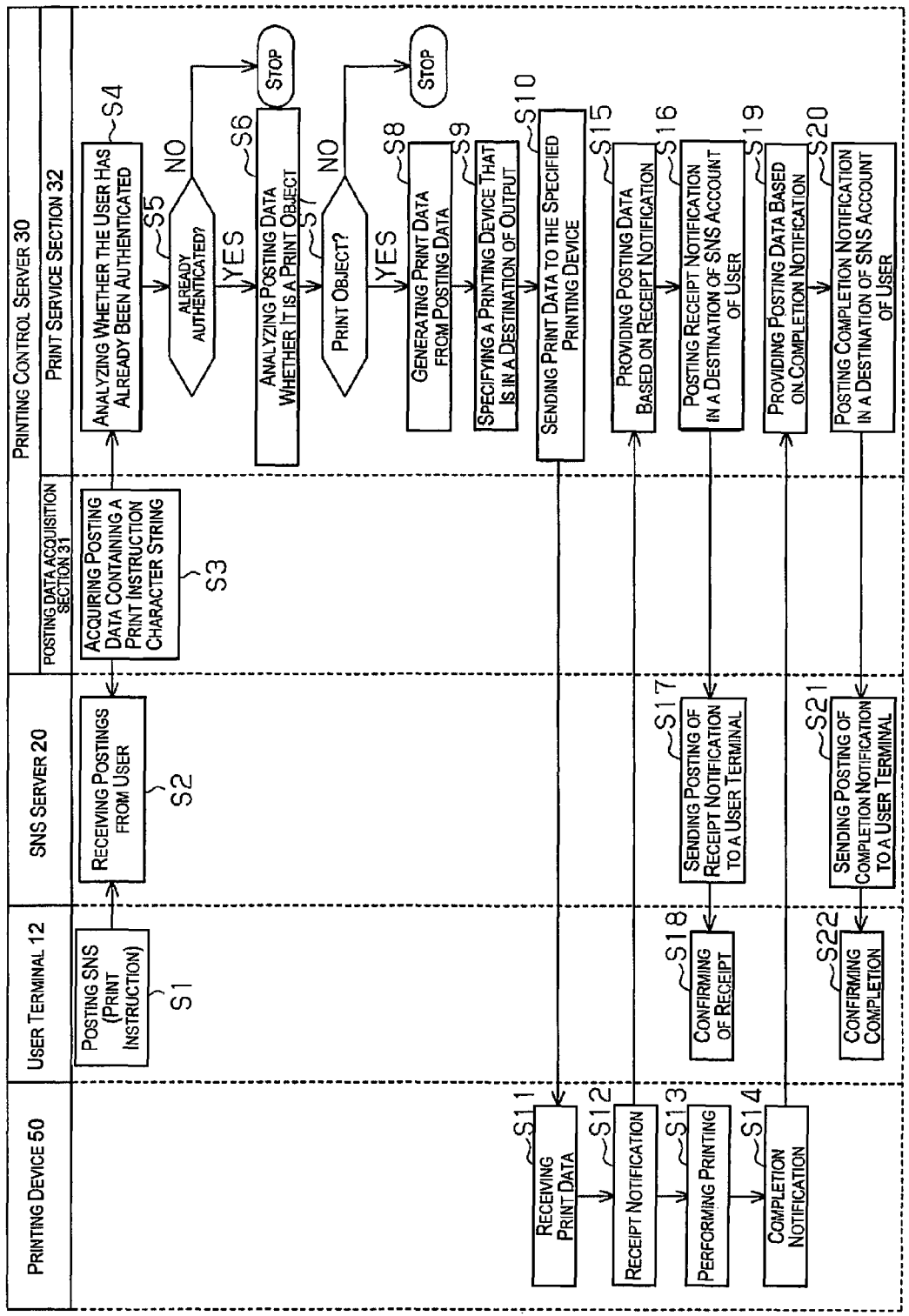
FIG. 7 is a sequence diagram showing a processing flow of the print support system.

Next, using FIG. 7, the function of the printing control server 30 in the print support system 11 constituted as mentioned above will be explained.

Initially, in Step S1, posting to the SNS is performed. In this embodiment, the posting action from the terminal 12 by the user or the posting action addressed to the user from the terminal 12 by another user becomes a print instruction. In detail, the user connects the terminal 12 to the SNS server 20 to display the posting screen 61 shown in FIG. 5 on the display section 12a, creates a posting document 64 in the posting area 62 and writes a print instruction character string 59 in this posting document 64. In the example of FIG. 5, the print instruction character string 59 is a hash tag, and for example, "#print" is written. Further, in the case of specifying a print condition, a condition specifying character string 59A is also written in the posting document 64. As one of print conditions, in the case of specifying the number of copies being "three," "#3" is written as the condition specifying character string 59A. Further, a link 65 such as an URI of a storage location of image data is provided as necessary. Then, by operating the control section of the terminal 12, the posting is sent.

In Step S2, the SNS server 20 receives the posting from the user.

In Step S3, the posting data acquisition section 31 of the printing control server 30 acquires the posting data. By preliminarily requesting the posting containing the print instruction character string 59 as a condition of the printing to be provided to the SNS server 20, the posting data acquisition section 31 monitors the posting containing the print instruction character string 59. If there is a posting containing the print instruction character string 59, the posting data acquisition section 31 acquires the data of the posted contents and the metadata accompanied by the posting as posting data. Then, the posting data acquired by the posting data acquisition section 31 is sent to the print service section 32.

In Step S4, the authentication section 41 analyzes the posted data whether or not the transmitter of the posted data or the recipient (address) of the posted data is a user who has been already authenticated. That is, the authentication section 41 analyzes the posted data whether or not the SNS account of the transmitter of the posting or the SNS account of recipient (address) of the posting is a user who has been already registered (authenticated) in the setting data SD.

In Step S5, the authentication section 41 judges whether or not the account has been already authenticated. The authentication section 41 judges as the account has been authenticated when one of SNS accounts of the transmitter and the recipient of the posting has been registered as a user in the setting data SD. If the authentication section 41 judges that the account has not been authenticated, the processing is stopped. If it judges that the account has been authenticated, the routine proceeds to Step S6.

In Step S6, the analysis and determination section 42 analyzes whether or not the posting data is a print object. In detail, the analysis and determination section 42 analyzes the posting data whether or not a print instruction character string 59 (in this example, "#print") is contained in the posted document 64. In this example, if a print instruction character string 59 is contained in the posted document 64, the posting is a print object. The analysis and determination section 42 also analyzes whether or not a condition specifying character string 59A is also contained in addition to the print instruction character string 59, and acquires the print condition specified by analyzing the condition specifying character string 59A if the condition specifying character string 59A is contained. For example, when "#3" is contained, it acquires that the number of copies is "three" as one of print conditions.

In Step S7, the analysis and determination section 42 analyzes whether or not the posting data is a print object. When the posting data is not a print object containing a print instruction character string 59, the analysis and determination section 42 stops the processing, and when the posting data is a print object including the print instruction character string 59, the routine proceeds to Step S8.

In Step S8, the print data generation section 43 creates print data from the posting data. In detail, when the posted document 64 in the posting data and the posting data contain a link 65 such as an URI, etc., the print data generation section 43 also acquires a file to be referred from the URI specified by the link 65. The print data generation section 43 lays out print object components such as a posted document and an image in the posting data on the paper area PA developed on a memory, which is not illustrated in drawings, in accordance with a preliminarily determined layout or a layout selected by a user among a plurality of layout samples. In detail, the print data generation section 43 arranges the image 66 acquired from the URI on the image area GA in the paper area PA, arranges the icon 67 in the icon arrangement areaI IA, and also arranges the posted text 68 in the text arrangement area TA. At this time, the image 66, the icon 67 and the posted text 68 are enlarged or reduced so as to be arranged within the corresponding arrangement area with an appropriate size as needed. The print data generation section 43 creates print data PD based on the data after the layout.

At the time of creating the print data PD, the print data generation section 43 acquires the device number of the printing device 50 corresponding to the SNS account of the user by referring to the setting data SD managed by the related information managing section 46 and creates the print data PD using a print commando capable of being construed by the printing device 50 specified by the device number. Further, the information on a print condition (in this example, the number of copies (e.g., "three") acquired from the condition specifying character string by the analysis and determination section 42 is attached to the header of the print data PD. Data in which data of a predetermined data format (JPEG, BMP, GIF, PNG, TIF, PDF, etc., with an extension) not including a print commando is incorporated as it is can be used as print data. In this case, the destination printing device 50 converts the document data and the image data contained in the received data by the data converter equipped therein into CMYK data and performs printing.

In Step S9, the output destination specification section 44 specifies an output destination printing device 50. That is, output destination specification section 44 acquires the printer address (e.g., IP address) of the printing device 50 correlated with the SNS account of the user by referring to the setting data SD managed by the related information managing section 46 and specifies the printing device 50, which is an output destination, with the printer address.

In Step S10, the communication section 45 sends the print data to the specified printing device 50. That is, the communication section 45 sends the print data PD to the specified printer address. It can be configured such that the communication section 45 notifies the printing device 50 of an instruction of acquiring the print data and the printing device 50 accesses the printing control server 30 in response to the notification to acquire the corresponding print data.

In Step S11, the printing device 50 receives the print data PD.

In Step S12, the printing device 50 sends the receipt notification indicating that the print data PD has been received to the printing control server 30 via the Internet 70. This receipt notification is received by the communication section 45 of the printing control server 30 and acquired by the print service section 32.

In Step S13, the printing device 50 executes printing based on the print data PD. In the header of the print data PD, the print condition specified by the condition specifying character string 59A (in this example, the number of copies is "three") is specified. The printing device 50 performs three printings based on the posting data in accordance with the specification.

In Step S14, the printing device 50 sends a completion notification to the printing control server 30 upon completion of the printing. This completion notification is received by the communication section 45 of the printing control server 30 and acquired by the print service section 32.

The print service section 32 of the printing control server 30 performs the following processing based on the receipt notification and the completion notification received from the printing device 50.

In Step S15, based on the receipt notification, the print service section 32 creates posting data which is a posted document 64, or a document capable of notifying the user of the fact of receipt. The receipt notification at this time can be binary data of predetermined bits capable of identifying the type of the notification or text data of a document indicating the receipt of the print instruction.

In Step S16, the print service section 32 posts posting data for a receipt notification to the SNS server 20 with respect to the SNS account of the user linked to the printer address of the printing device 50 which is an origin of the receipt notification.

In Step S17, the SNS server 20 sends the posting data for a receipt notification received to the user terminal 12 specified by the SNS account.

In Step S18, the user terminal 12 displays the posting of the receipt notification received on the display section 12a. The user can confirm that the print instruction has been accepted by the printing device 50 by viewing the posting of the receipt notification displayed on the display section 12a. Thereafter, the completion notification sent by the printing device 50 at the time of completion of the printing is received by the printing control server 30.

In Step S19, the print service section 32 creates posting data based on the completion notification. The completion notification at this time can be binary data of predetermined bits capable of identifying the type of the notification or text data of a document indicating the completion of printing. The print service section 32 creates posting data for completion notification in which a document capable of notifying a user of the print completion constitutes a posited text.

In Step S20, the print service section 32 posts a completion notification to the SNS account of the user corresponding to the printing device 50. That is, the posting data for a completion notification will be sent from the printing control server 30 to the SNS server 20.

In Step S21, the SNS server 20 sends the posting of a completion notification received to the user terminal 12.

In Step S22, the posting of the completion notification received by the user terminal 12 is displayed on the display section 12a, so that the user can confirm that the printing by the printing device 50 has been completed.

When an error has occurred in the middle of executing printing after receipt of the receipt notification, the printing device 50 sends an error notification notifying the fact to the printing control server 30. The print service section 32 creates posting data based on the received error notification. Then, the print service section 32 sends the posting data for the error notification to the address of the SNS account of the user corresponding to the printing device 50. The posting for the error notification is sent from the SNS server 20 to the user terminal. The posting of the error notification received by the user terminal 12 is displayed on the display section 12a, so that the user can know that an error occurred in the printing device 50. It can be configured such that the printing control server 30 posts at least one of the receipt notification, the completion notification and the error notification to the SNS account of another user.

According to this embodiment detailed above, the following effects can be acquired.

(1) The posting data acquisition section 31 acquires the posting data including the print instruction character string 59 (an example of a specific character strings) from the SNS server 20. When a print instruction character string 59 is contained in the posted document 64 of the acquired posting data, the analysis and determination section 42 makes the printing device 50 corresponding to the user posted or the user to whom the posting was addressed execute printing based on the posting data. Therefore, when a user posts a posting document 64 including a print instruction character string 59, it becomes possible to make the printing device 50 corresponding to the user execute printing based on the posted data.

(2) Since the print instruction character string 59 is a tag, by specifying the print instruction character string 59 which is a tag in the SNS server to the SNS server 20, the posting data acquisition section 31 can obtain by narrowing data down to the necessary number of posting data including the print instruction character string 59 from the SNS server. Therefore, the printing control server 30 can reduce the load of processing the posting data.

(3) In the posting data which is a print object, in addition to the print instruction character string 59 which instructs execution of printing, a condition specifying character string 59A for specifying the print condition is contained. Therefore, a user can make the printing device 50 execute printing based on the posting data specified by the print instruction character string 59 under the print condition specified by the condition specifying character string 59A.

(4) The printer address of the printing device 50 corresponding to the printer address of the printing device 50 corresponding to the SNS account of the user who was a source of the posting or the SNS account of the user to whom the posting was address is specified as an output destination of the print data PD. Therefore, when a user posts with a print instruction character string 59 contained in the posted document 64, or a third party posts to a destination of user with a print instruction character string 59 contained in the posted document 64, it becomes possible to make the printing device 50 corresponding to the user execute printing based on the posted data.

(5) Since the printing control server 30 sends the posting capable of notifying the SNS account of the user of the fact of the receipt upon receipt of the receipt notification from the printing device 50, the user can confirm by the display section 12a of the terminal 12 that the print instruction was received by the printing device 50. Further, since the printing control server 30 sends the posting capable of notifying the SNS account of the user of the fact of the completion upon receipt of the completion notification from the printing device 50, the user can confirm by the display section 12a of the terminal that the printing by the printing device 50 has completed. Further, since the printing control server 30 sends the posting capable of notifying the contents of the error notification to the SNS account of the user upon receipt of the error notification from the printing device 50, the user can know by the display section 12a of the terminal that an error has occurred in the printing device 50.

(6) The printing system 60 is equipped with the printing control server 30 and the printing device 50 in which the address on the network is administrated corresponding to a user by the administration section of the printing control server 30. For this reason, when a user sends a posting containing a print instruction character string 59 to the SNS server 20, the print data created based on the posting data acquired from the SNS server 20 is sent to the address on the network, which enables to make the printing device corresponding to the user execute printing based on the posting data.

The aforementioned embodiment can be changed into the following embodiments.

It can be configured such that a user can decide the print instruction character string 59 by itself. An input column for a print instruction character string decided by a user is displayed on the user page UP which is displayed when the terminal 12 is connected to the printing control server 30, and when the print instruction character string is input in the input column, the printing control server 30 writes the print instruction character string corresponding to the user (e.g., the SNS account of the user) in the setting data SD. For example, if it is desired to print a posting relating soccer, "soccer" as a character string is set in the posted document. In this case, by preliminarily requesting providing of the posting data containing the character string "soccer" to the SNS server 20 using the hash tag "#soccer," the posting data acquisition section 31 of the printing control server 30 acquires the posting data containing the character string "soccer" in real time. The analysis and determination section 42 of the printing control server 30 judges whether or not the print instruction character string (e.g., "#soccer") set by the user is contained in the posting data acquired by the posting data acquisition section 31, and when the print instruction character string is contained, the posting data is made to be a print object, and the analysis and determination section 42 make the printing device 50 correlated to the user execute the printing based on the posting data. At this time, the posting can be limited to the posting in which the user is a source or destination, or the posting to be displayed in the time-line 63 of the user, and the posting data containing the print specifying character string specified by the user among postings on the time-line 63 can be made to be a print object.

It can be configured such that a user can define the print instruction character string. For example, in place of or in addition to "#print," it can be configured such that a user unique print instruction character string can be set. In this case, when a user or another user who posts addressed to the user posts with a print instruction character string (e.g., "#prt" or "print") defined by the user contained in the posted document, it becomes possible to make the printing device correlated to the user execute printing based on the posted data.

Other than the print condition, it can be configured such that the print condition such as a character size or an image size can be set with a character string (e.g., a hash tag).

The specific character string is not limited to a tag. Characters strings other than a tag can be used.

The posting data acquisition section 31 specifies the SNS account of the user who has preliminarily registered in the setting data SD in the storage section 33 to the SNS server 20, and makes the SNS server monitor the posting in which the SNS account of the specified user is set as a source (sender) or a destination (receiver). It can be configured such that when the SNS server 20 finds the posting satisfying the condition, the printing control server 30 receives the posting data. With this structure, since it is possible to acquire postings by narrowing down to postings in which the source or destination is user-registered, the processing load of the posting data acquisition section 31 and the analysis and determination section 42 can be reduced.

In the embodiment, in cases where both the user who posted and the user to whom a posting was addressed, it was configured to make the printing device correlated to the user execute printing based on the posting data. But, it can be configured to make the printing device corresponding to the user execute printing based on the posting data only when one of the users is set. For example, if it is configured to make the printing device correlated to the posted user execute printing, by posting, the user can make the printing device 50 specified by the user execute printing based on the posting data posted by the user. On the other hand, if it is configured to make the printing device correlated to the user to whom the posting was addressed execute printing, by posting to the destination of a user by a third party, the third party can make the printing device 50 specified by the user execute printing based on the posting data posted by the third party.

In the embodiment, it can be configured such that the printing control server 30 acquires all of postings from the SNS server 20 and selectively acquire postings containing specific character strings therein.

The print condition specified by a condition specifying character string 59A is not limited to the number of copies, and can be any other print conditions. For example, at least one of a print color (color/gray scale), print quality (high quality/draft), paper size (A4 size/B5 size/Letter size/A5size/Legal size, etc.), and paper type (normal paper/high-quality paper/photo paper/recycled paper, etc.) can be specified by a condition specifying character string 59A in the posted document 64. The print condition specifying function by the condition specifying character string 59A can be eliminated.

It can be configured such that not all but one or two of the receipt notification, the completion notification, and the error notification is posted and sent to the user terminal 12. For example, it can be configured such that only the receipt notification and the completion notification among three notifications are posted and sent to the user terminal 12. Further, it also can be configured that only the receipt notification among three notifications is posted and sent to the user terminal 12. Further, it can be configured such that by adding to at least one of three notifications, other notification is posted and sent to the user terminal 12. As the other notification, for example, an ink residual amount notification, a print progress state report notification, etc., can be exemplified.

The user discrimination information can be indirectly correlated to the printing device. For example, the SNS account and the name are correlated and further the name and the printer address are correlated. Even with this structure, the printing device 50 correlated to the user can be specified.

In the embodiment too, in place of the structure that the other users can be third parties other than registered users if the other users are destination users registered in the setting data SD, the other users are limited to registered user registered in the setting data SD.

It can be configured such that the printing control server 30 acquires all postings received by the SNS server 20 and postings containing a print instruction character string are selected among the all postings acquired.

The user discrimination information for identifying the posting from a user and the posting of the destination of user is not limited to the user account (SNS account) on the SNS, and can be a nickname which would not be overlapped with other users in the printing control server 30.

A device which performs printing based on the posting data is not limited to the printing device corresponding to the user. For example, printing device specifying information can be contained in the posted contents together with a specific character string, and the printing control server 30 makes the printing device 50 specified based on the printing device specifying information execute printing based on the posting data.

In cases where there exist a posted document 64 in the posting data and a link 65, the image of the reference file was made to be a print object, but only the posted document or only the image can be made to be a print object.

In cases where there is no printing device correlated to a user, an error message can be displayed on the user terminal 12.

It is sufficient that the printing device has at least a printing function capable of printing at least one of a document and an image on a medium and a communication function capable of being connected to the printing control server 30 in a communicable manner. Further, the printing device can be an inkjet type, a dot impact type or a laser type. Further, the printing device can be a serial printer, a line printer or a page printer.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A printing system comprising:
   a printing control server that
   acquires, from a service offering server which provides a posting service, posting data containing a specific character string with a posted content, the specific character string and the posted content being published and shared between a posting user posting the posting content and a receiving user to whom the posting content is addressed, the specific character string including a print instruction character string that has a specific symbol and a print character string that comes after the specific symbol and indicates a print condition as an instruction of executing of printing the posted content by the posting user, and
   sends print data based on the posting data to a printing device via a network and causes the printing device to execute printing based on the print data, which includes the print condition.

2. The printing system according to claim 1, wherein the printing control server specifies a tag of the specific character string as a condition of the posting data to be provided and receives the posting data containing the tag of the specific character string from the service offering server.

3. The printing system according to claim 1, wherein the printing control server further associates the printing device with a user of the printing device and administers the printing device as being associated with the user, and causes the printing device associated with the posting user or the receiving user to execute printing based on the posting data.

4. The printing system according to claim 1, wherein the printing control server further receives, after sending the print data created based on the posting data, at least one of notifications including a receipt notification indicating a receipt of a print instruction, a completion notification indicating completion of printing, and an error notification indicating occurrence of a print error from the printing device, and posts a content of the at least one of the notifications received to the service offering server addressing a user of a terminal which is an origin of the posting data or a user of the printing device that has printed the posting data.

5. The printing system according to claim 1, further comprising:
   the printing device as recited in claim 1, the printing device being administered by the printing control server that associates the printing device with a user of the printing device.

6. The printing system according to claim 1, wherein the print character string is not printed by the printing device.

7. The printing system according to claim 1, wherein
   the printing control server creates the print data such that the print character string is in a header of the print data, and the print character string is not printed by the printing device.

8. A printing system comprising:
   a printing control server that
   acquires, from a service offering server which provides a posting service, posting data containing a specific character string with a posted content, the specific character string and the posted content being published and shared between a posting user posting the posting content and a receiving user to whom the posting content is addressed, the specific character string including a print instruction character string that has a specific symbol which is a specific tag provided in the posting service and a print character string that comes after the specific symbol, and
   creates print data from the posting data including the print instruction character string, and sends the print data to a printing device via a network to cause the printing device to execute printing based on the print data.

9. The printing system according to claim 8, wherein
   the specific symbol is a hash tag provided in the posting service.

10. The printing system according to claim 8, wherein
   the specific symbol and the print character string are not printed by the printing device.

* * * * *